US012795000B2

(12) United States Patent
Muhammad et al.

(10) Patent No.: US 12,795,000 B2
(45) Date of Patent: Nov. 10, 2026

(54) MANAGEMENT OF INTEROPERABILITY TEST PROFILE IN M-PLANE OF O-RAN

(71) Applicant: RAKUTEN MOBILE, INC., Tokyo (JP)

(72) Inventors: Awn Muhammad, Tokyo (JP); Pankaj Shete, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 177 days.

(21) Appl. No.: 18/562,169

(22) PCT Filed: Apr. 20, 2022

(86) PCT No.: PCT/JP2022/018328
§ 371 (c)(1),
(2) Date: Nov. 17, 2023

(87) PCT Pub. No.: WO2023/139811
PCT Pub. Date: Jul. 27, 2023

(65) Prior Publication Data
US 2024/0244125 A1 Jul. 18, 2024

(30) Foreign Application Priority Data
Jan. 18, 2022 (WO) ................... JPT/JP2022/001559

(51) Int. Cl.
*G06F 15/173* (2006.01)
*G06F 15/16* (2006.01)
(Continued)

(52) U.S. Cl.
CPC .......... *H04L 69/167* (2013.01); *H04L 67/142* (2013.01); *H04W 52/0206* (2013.01)

(58) Field of Classification Search
CPC ...... H04L 69/167; H04L 67/14; H04L 67/142
(Continued)

(56) References Cited

U.S. PATENT DOCUMENTS 11,659,621 B2 * 5/2023 Backman .............. H04L 69/167 370/328
2007/0274266 A1 * 11/2007 Oyama .................. H04L 63/08 370/335
(Continued)

FOREIGN PATENT DOCUMENTS

JP 2021-083058 A 5/2021

OTHER PUBLICATIONS

Anil Umesh et al., "Overview of O-RAN Fronthaul Specifications", NTT DOCOMO Technical Journal, Jul. 2019, pp. 46-59, vol. 21, No. 1.
(Continued)

*Primary Examiner* — Bharat Barot
(74) *Attorney, Agent, or Firm* — Sughrue Mion, PLLC

(57) ABSTRACT

A radio access network control apparatus has at least one processor that performs: by a test profile management unit, managing a test profile of an interoperability test of an M-Plane in an O-RAN compliant device capable of supporting IPv6. A radio access network control apparatus has at least one processor that performs: by a test profile management unit, managing a test profile of an interoperability test of an M-Plane in an O-RAN compliant device capable of supporting TLS.

18 Claims, 7 Drawing Sheets

(51) Int. Cl.
*H04L 67/142* (2022.01)
*H04L 69/167* (2022.01)
*H04W 52/02* (2009.01)

(58) Field of Classification Search
USPC .................................................. 709/223–224
See application file for complete search history.

(56) References Cited

U.S. PATENT DOCUMENTS

| | | | | |
|---|---|---|---|---|
| 2020/0053609 | A1* | 2/2020 | Engström ............. | H04W 48/16 |
| 2021/0136658 | A1 | 5/2021 | Rönneke et al. | |
| 2021/0314211 | A1* | 10/2021 | Grayson ............. | H04L 41/0213 |
| 2022/0006509 | A1* | 1/2022 | Shibata ................. | H04W 28/16 |
| 2023/0353984 | A1* | 11/2023 | Iun ........................ | H04W 4/029 |
| 2025/0203367 | A1* | 6/2025 | Haddad ............... | H04W 12/043 |

OTHER PUBLICATIONS

Anil Umesh et al., "Outline of O-RAN Fronthaul Specifications", NTT DOCOMO Technical Journal, Apr. 2019, pp. 43-55, vol. 27, No. 1.
O-RAN Fronthaul Working Group, "Fronthaul Interoperability Test Specification(IOT)" IOT.0-v05.00, Jul. 6, 2021, 119 pages.
O-RAN Fronthaul Working Group, "Fronthaul Interoperability Test Specification(IOT)" IOT.0-v06.01, Feb. 17, 2022, 124 pages.
International Search Report for PCT/JP2022/001559 dated Mar. 15, 2022.
International Search Report for PCT/JP2022/018328 dated Jun. 28, 2022.
International Search Report for PCT/JP2022/017799 dated Jul. 5, 2022 {PCT/ISA/210}.

* cited by examiner

FIG. 4

| **Category** | **Item** | **Related O-RAN M-Plane specification section(s)** | |
|---|---|---|---|
| High Level Description | Architectural models | 2.1.2 M-Plane architecture model | Hierarchical model |
| | IP version | 2.1.3 Transport Network | IPv6 |
| | Hash algorithm for data integrity | 2.4 Security | Entry 1) SSHv2 -HMAC-SHA2-256<br>Entry 2) TLS1.2 - SHA256 |
| | Cyphering algorithm | 2.4 Security | Entry 1) SSHv2 - AES128-CTR<br>Entry 2) TLS1.2 -AES128-GCM |

FIG. 5

| **Category** | **Item** | **Related O-RAN M-Plane specification section(s)** | |
|---|---|---|---|
| "Start up" installation | O-RU identification by DHCP option | 3.1.1 O-RU identification in DHCP | DHCPv6 (Option: 16) |
| | VLAN Discovery | 3.1.2 Management Plane VLAN Discovery Aspects | support VLAN SCAN |
| | IP address assignment | 3.1.3 O-RU Management Plane IP Address Assignment | Entry 1) IPv6 State-full address configuration<br>Entry 2) Stateless Address Auto-Configuration (SLAAC) |
| | O-RU controller discovery | 3.1.4 O-RU Controller Discovery | DHCPv6 (Option: 17) |
| | DHCP format of O-RU controller discovery | 3.1.4 O-RU Controller Discovery | O-RU Controller IP Address |
| | NETCONF Call Home | 3.2 NETCONF Call Home to O-RU Controller(s) | Entry 1) SSH - call home port:4334<br>Entry 2) TLS - call home port 4335 |
| | SSH Connection Establishment | 3.3 SSH Connection Establishment | password-based authentication |
| | TCP port for SSH establishment (for test purpose) | 3.3.1 NETCONF Security | Default (port 830) |
| | NETCONF Authentication | 3.3.2 NETCONF Authentication | Entry 1) SSH password-based authentication<br>Entry 2) TLS - X.509 Certificate |
| | User Account Provisioning | 3.3.3 User Account Provisioning | default sudo |

FIG. 6

| **Category** | **Item** | **Related O-RAN M-Plane specification section(s)** | |
|---|---|---|---|
| "Start up" installation | sudo | 3.4 NETCONF Access Control | used |
| | nms | 3.4 NETCONF Access Control | not used |
| | fm-pm | 3.4 NETCONF Access Control | not used |
| | swm | 3.4 NETCONF Access Control | not used |
| | NETCONF capability | 3.5 NETCONF capability discovery | yang-library,<br>Writable-running Capability,<br>rollback on error,<br>XPATH capability,<br>Notifications,<br>Interleave capability |
| | Watchdog timer | 3.6 Monitoring NETCONF connectivity | used |

FIG. 7

| Category | Item | Related O-RAN M-Plane specification section(s) | |
|---|---|---|---|
| O-RU to O-DU Interface Management | VLAN tagging for C/U/M-Plane | 3.1.2 Management Plane VLAN Discovery Aspects<br>4.3 C/U Plane VLAN Configuration | used for C/U/M-Plane |
| | C/U Plane IP Address Assignment | 4.4 O-RU C/U Plane IP Address Assignment | not used |
| | Definition of processing elements | 4.5 Definition of processing elements | a combination of VLAN identity and MAC address |
| | C/U Plane Transport Connectivity | 4.6 Verifying C/U Plane Transport Connectivity | Loop-back Protocol (LB/LBM) |
| | O-RU Monitoring of C/U Plane Connectivity | 4.10 O-RU Monitoring of C/U Plane Connectivity | not used |
| Configuration Management | Baseline configuration | 6.1 Baseline configuration | 2 phases |
| Fault Management | subscribe notification | 8.2 Manage Alarms Request | default stream |
| Synchronization Aspects | Sync Capability Object | 10.2 Sync Capability Object | Entry 1: CLASS_B<br>Entry 2: ENHANCED |
| Details of O-RU Operations | Activation, deactivation and sleep | 12.3.2 Activation, deactivation and sleep | used |

MANAGEMENT OF INTEROPERABILITY TEST PROFILE IN M-PLANE OF O-RAN

CROSS REFERENCE TO RELATED APPLICATIONS

This application is a National Stage of International Application No. PCT/JP2022/018328 filed Apr. 20, 2022, claiming priority based on PCT International Application No. PCT/JP2022/001559 filed Jan. 18, 2022.

BACKGROUND OF THE INVENTION

1. Field of the Invention

The present disclosure relates to management of an interoperability test profile in an M-Plane of an O-RAN

2. Description of the Related Art

For the purpose of the so-called open radio access network (RAN) in a mobile communication system, "Open RAN", "O-RAN", "vRAN" etc. are being considered. In this specification, "O-RAN" is used as a comprehensive term for such various "open radio access networks". Therefore, the interpretation of "O-RAN" in this specification is not limited to the standard and/or the specification of the same name "O-RAN" specified by the O-RAN Alliance.

A radio unit (RU) in the O-RAN is called an O-RU and provides a communication cell to a communication device (UE: User Equipment). An O-RU is controlled by a RAN node composed by an O-CU, which is a central unit (CU), and/or an O-DU, which is distributed unit (DU). Furthermore, a RAN node is controlled by a higher-level controller such as a Near-RT RIC (Near-Real Time RAN Intelligent Controller) and/or a Non-RT RIC (Non-Real Time RAN Intelligent Controller). In the O-RAN, a virtual infrastructure also referred to as O-Cloud that virtually manages a set of a plurality of RAN nodes is also provided.

Patent Literature 1: JP-A-2021-83058

SUMMARY OF THE INVENTION

In the conventional O-RAN, all O-Rus have been required to support the Ipv4 of the Internet Protocol version. However, some telecommunication carriers that operate O-RANS (hereinafter also referred to as operators or carriers) may not use Ipv4, resulting in the Ipv4 functionality implemented in O-Rus in vain. In addition, the interoperability test (IOT) profile in the M-Plane of the conventional O-RAN only supports Ipv4, and does not support TLS (Transport Layer Security) etc.

The present disclosure was made in view of these circumstances, and its purpose is to provide a radio access network control apparatus and the like that can alleviate the restrictions about the interoperability test profile in the M-Plane of the O-RAN.

In order to solve the above problem, a radio access network control apparatus in a certain aspect of the present disclosure comprises at least one processor that performs: by a test profile management unit, managing a test profile of and interoperability test of M-plane in O-RAN compliant device capable of supporting Ipv6.

According to this aspect, the test profile of the interoperability test of the M-Plane in an O-RAN compliant device of the O-RAN is capable of supporting Ipv6, thereby alleviating the conventional restrictions about such test profile.

Another aspect of the present disclosure is also a radio access network control apparatus. The apparatus comprises at least one processor that performs: by a test profile management unit, managing a test profile of interoperability test of M-Plane in O-RAN compliant device capable of supporting TLS.

According to this aspect, the test profile of the interoperability test of the M-Plane of in an O-RAN compliant device is capable of supporting TLS, thereby alleviating the conventional restrictions about such test profile.

Further another aspect of the present disclosure is a radio access network control method. The method comprises: managing a test profile of interoperability test of M-Plane in O-RAN compliant device capable of supporting Ipv6.

Further another aspect of the present disclosure is also a radio access network control method. The method comprises: managing a test profile of interoperability test of M-Plane in O-RAN compliant device capable of supporting TLS.

Further another aspect of the present disclosure is a computer-readable medium. The computer-readable medium stores a radio access network control program causing a computer to perform: managing a test profile of interoperability test of M-Plane in O-RAN compliant device capable of supporting Ipv6.

Further another aspect of the present disclosure is a computer-readable medium. The computer-readable medium stores a radio access network control program causing a computer to perform: managing a test profile of interoperability test of M-Plane in O-RAN compliant device capable of supporting TLS.

In addition, any combination of the above components, and any conversion of the expression of the present disclosure among methods, devices, systems, recording media, computer programs and the like are also encompassed within this disclosure.

According to the present disclosure, the restrictions about the interoperability test profile in the M-Plane of the O-RAN can be alleviated.

BRIEF DESCRIPTION OF THE DRAWINGS

FIG. 4 shows a concrete example of an interoperability test profile in the M-Plane of the O-RAN, which can support IPv6 and TLS.

FIG. 5 shows a concrete example of an interoperability test profile in the M-Plane of the O-RAN, which can support IPv6 and TLS.

FIG. 6 shows a concrete example of an interoperability test profile in the M-Plane of the O-RAN, which can support IPv6 and TLS.

FIG. 7 shows a concrete example of an interoperability test profile in the M-Plane of the O-RAN, which can support IPv6 and TLS.

DETAILED DESCRIPTION OF THE INVENTION

In the following, the present embodiment is described in accordance with the "O-RAN" which is the standard and/or the specification developed by the O-RAN Alliance. Therefore, the known terms defined in "O-RAN" will be used in the present embodiment just for convenience, but the technologies according to this disclosure can be applied to other existing radio access networks such as "Open RAN" and "vRAN" and/or to similar radio access networks that may be developed in the future.

Figure 1:
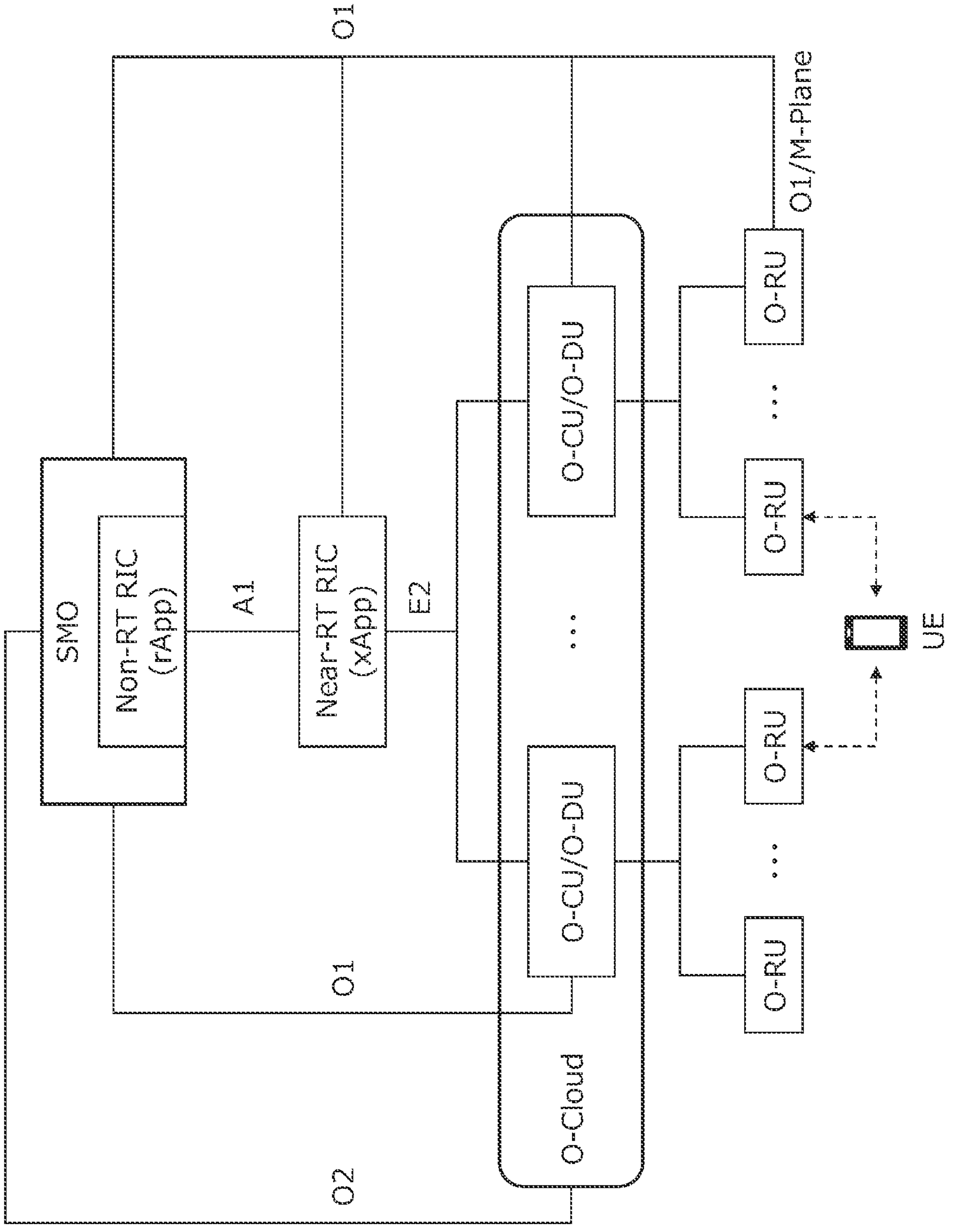
FIG. 1 is a schematic overview of a radio access network control apparatus.

FIG. 1 shows a schematic overview of the radio access network control apparatus according to the present embodiment. This radio access network control apparatus is a RAN control apparatus that controls radio access network in accordance with the O-RAN. The SMO (Service Management and Orchestration) controls the entire RAN control apparatus or the entire O-RAN and coordinates the operations of each portion. The SMO is equipped with a Non-RT RIC (Non-Real Time RAN Intelligent Controller) that functions as the overall control processor responsible for overall control. The Non-RT RIC, which has a relatively long control cycle (e.g. 1 second or longer), issues guidelines, policies, guidance etc. concerning the operation of each RAN node (O-CU and/or O-DU as described below). Specifically, the Non-RT RIC executes application software called rApp to issue operational policy for each RAN node to the Near-RT RIC (Near-Real Time RAN Intelligent Controller) through the A1 interface. The Near-RT RIC, which has a relatively short control cycle (e.g. shorter than 1 second), executes application software called xApp to control each RAN node (O-CU/O-DU) itself and/or general-purpose hardware etc. in the radio unit (O-RU) connected to each of the RAN nodes through the E2 interface.

The illustrated RAN node has an O-CU, which is an O-RAN compliant central unit (CU), and/or O-DU, which is an O-RAN compliant distributed unit (DU). Both of the O-CU and the O-DU are responsible for baseband processing in the O-RAN, where the O-CU is provided on the side of the core network (not shown in the figure), and the O-DU is provided on the side of the O-RU, which is an O-RAN compliant radio unit (RU). The O-CU may be divided into the O-CU-CP, which constitutes the control plane (CP), and the O-CU-UP, which constitutes the user plane (UP). The O-CU and the O-DU may be integrally configured as a single baseband processing unit. The O-eNB as a base station compliant with the O-RAN and the 4th generation mobile communication system (4G), may be provided as a RAN node. One or more O-RUs are connected to each RAN node (O-CU/O-DU) and are controlled by the Near-RT RIC via each of the RAN nodes. A communication device (UE: User Equipment) in the communication cell provided by each O-RU can be connected to each of the O-RUs, and can perform mobile communication with the core network (not shown) via each RAN node (O-CU/O-DU).

Each RAN node (O-CU/O-DU) and the Near-RT RIC provide operational data etc. of each RAN node, each O-RU and each UE through the O1 interface to the SMO for so-called FCAPS (Fault, Configuration, Accounting, Performance, Security). The SMO updates as necessary the operational policy for each RAN node issued by the Non-RT RIC to the Near-RT RIC through the A1 interface, based on the operational data acquired through the O1 interface. The O-RUs may be connected to the SMO for the FCAPS by the O1 interface and/or other interfaces (e.g. Open Fronthaul M-Plane).

The O-Cloud as a virtual infrastructure that virtually manages a set of the plurality of RAN nodes (O-CUs/O-DUs) is connected to the SMO by an O2 interface. The SMO generates a resource allocation policy concerning the resource allocation and/or a workload management policy concerning the workload management of the plurality of RAN nodes, based on the operational states of the plurality of RAN nodes (O-CUs/O-DUs) acquired from the O-Cloud through the O2 interface, and issues them to the O-Cloud through the O2 interface.

Figure 2:
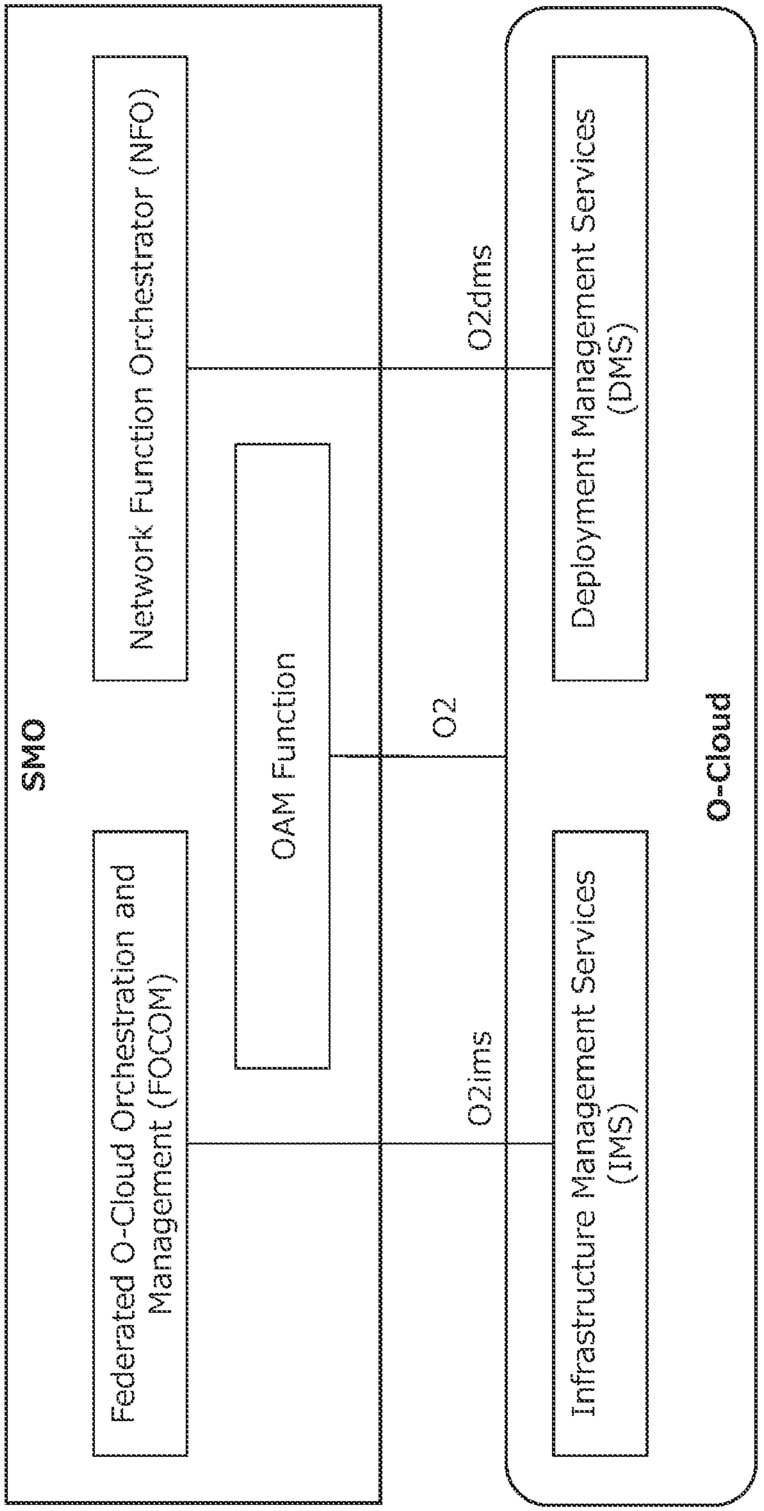
FIG. 2 schematically shows various functions realized in the SMO and/or the Non-RT RIC and O-Cloud.

FIG. 2 schematically shows the various functions realized in the SMO and/or the Non-RT RIC and the O-Cloud. In the SMO, three main functions are realized, which are the FOCOM (Federated O-Cloud Orchestration and Management), the NFO (Network Function Orchestrator) and the OAM Function. In the O-Cloud, two main functions are realized, which are the IMS (Infrastructure Management Services) and the DMS (Deployment Management Services).

The FOCOM manages resources in the O-Cloud, while receiving services from the IMS of the O-Cloud through the O2 interface (O2ims). The NFO realizes the orchestrated operation of a set of network functions (NFs) by a plurality of NF Deployments in the O-Cloud, while receiving services from the DMS of the O-Cloud through the O2 interface (O2dms). The NFO may utilize the OAM Function to access the deployed NFs through the O1 interface. The OAM Function is responsible for the FCAPS management of O-RAN managed entities such as the RAN nodes. The OAM Function in the present embodiment can be a functional block where callbacks are provided for receiving data concerning failures and/or operational states of the plurality of RAN nodes that are virtually managed by the O-Cloud, by monitoring processes or procedures over the O2ims and/or the O2dms. The IMS is responsible for managing the O-Cloud resources (hardware) and/or the software used for managing them, and provides services primarily to the FOCOM of the SMO. The DMS is responsible for the management of the plurality of NF Deployments in the O-Cloud, specifically the initiation, monitoring, termination etc., and provides services primarily to the NFO of the SMO.

Figure 3:
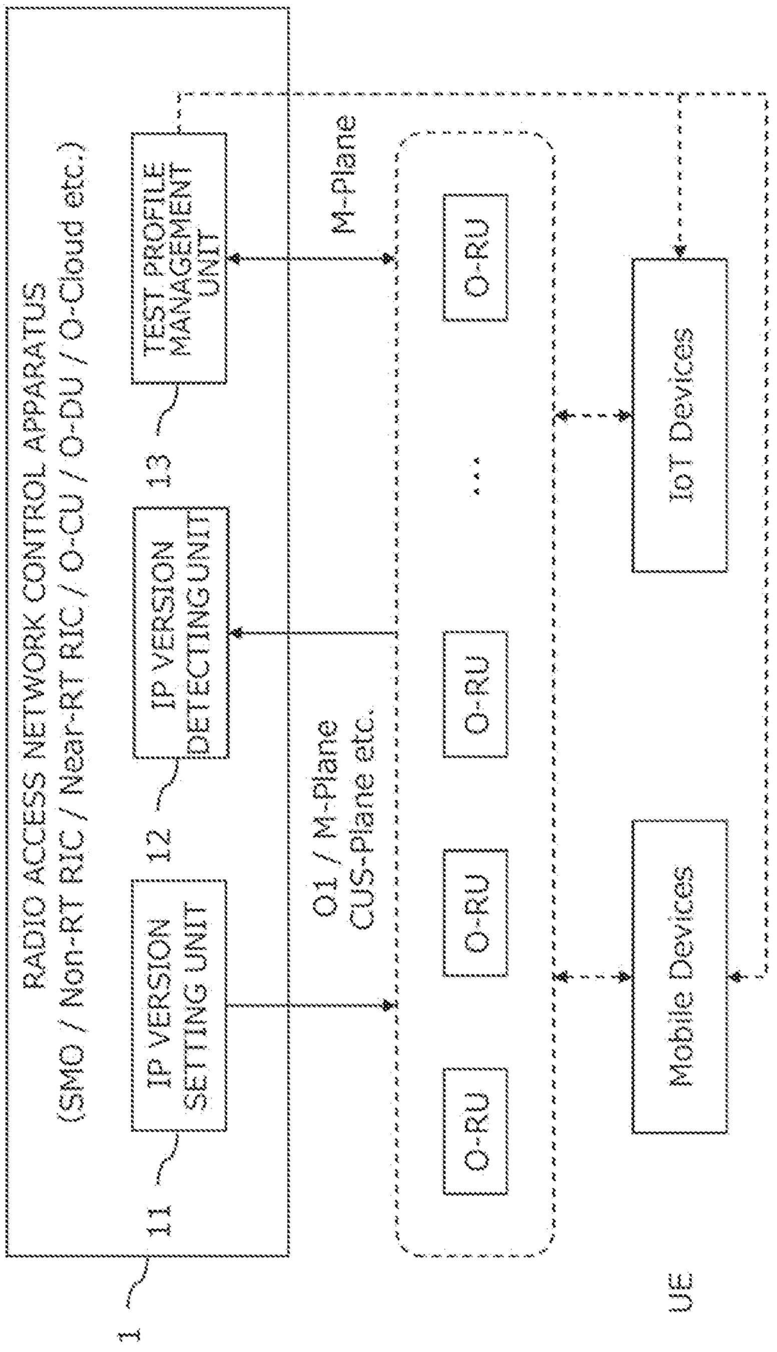
FIG. 3 is a functional block diagram schematically showing the radio access network control apparatus.

FIG. 3 is a functional block diagram schematically showing the radio access network control apparatus 1 according to the present embodiment. The radio access network control apparatus 1 comprises an IP version setting unit 11, an IP version detecting unit 12, and a test profile management unit 13. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across plurality of computers. Especially in the present embodiment, some or all of the functional blocks of the radio access network control apparatus 1 may be realized in a computer and/or a processor provided in any part of the O-RAN such as the SMO, the Non-RT RIC, the Near-RT RIC, the RAN node composed by the O-CU and/or the O-DU, and the O-Cloud in a distributed manner or a centralized manner, or may be realized in a computer and/or a processor provided outside the O-RAN and capable of communicating with the O-RAN in a distributed manner or a centralized manner. It should be noted that the IP version setting unit 11 and the IP version detecting unit 12, which mainly control the O-RU, are provided outside the O-RU, but some or all of the functions of the test profile management unit 13 may be provided in the O-RU. Besides, at least one of the IP version setting unit 11 and the IP version detecting unit 12 may be provided.

The IP version setting unit 11 and/or the IP version detection unit 12 in the radio access network control apparatus 1 that controls the O-RAN including the O-RU as a radio unit, are capable of communicating in at least one direction via at least one interface with one or more O-RUs that are the main control targets. For example, as also schematically shown in FIG. 1, the O-RU can communicate bidirectionally or unidirectionally with the RAN node (O-CU and/or O-DU), the Near-RT RIC, the SMO (including the Non-RT RIC) etc. that can constitute the radio access network control apparatus 1, via the O1 interface, the Open Fronthaul M-Plane etc. The O-RU can also communicate bidirectionally or unidirectionally with the RAN node (O-CU and/or O-DU) etc. that can constitute the radio access network control apparatus 1, via the Open Fronthaul CUS-Plane etc.

The IP version setting unit 11, which can communicate with the O-RU, is capable of setting the Internet Protocol version required for each O-RU to IPV6. The IP version setting unit 11 is also capable of setting the Internet Protocol version required for each O-RU to IPv4. Furthermore, the IP version setting unit 11 is also capable of setting the Internet Protocol version required for each O-RU to both IPv4 and IPV6. In other words, the IP version setting unit 11 is capable of setting the Internet Protocol version required for each O-RU to at least three patterns "IPV4", "IPV6" and "both IPV4 and IPV6". It should be noted that the expressions "IPV4", "IPV6" and "both IPV4 and IPV6" focus only on IPv4 and/or IPv6. Therefore, they may include Internet Protocol versions other than IPv4 and IPV6.

The IP version detecting unit 12, which can communicate with the O-RU, is capable of detecting that IPv6 is included in the Internet Protocol version supported by each O-RU. The IP version detecting unit 12 is also capable of detecting that IPv4 is included in the Internet Protocol version supported by each O-RU. Furthermore, the IP version detecting unit 12 is also capable of detecting that both IPv4 and IPV6 are included in the Internet Protocol version supported by each O-RU. In other words, the IP version detecting unit 12 is capable of detecting that the Internet Protocol version supported by each O-RU is one of the at least three patterns "IPV4", "IPV6" and "both IPV4 and IPV6". It should be noted that the expressions "IPV4", "IPV6" and "both IPv4 and IPV6" focus only on IPv4 and/or IPV6. Therefore, they may include Internet Protocol versions other than IPV4 and IPV6.

For example, the IP version detecting unit 12 can acquire the information suggesting the Internet Protocol version supported by each O-RU, directly or indirectly from each of such O-RUs, using the NETCONF or other network configuration protocols implemented via the O1 interface etc. In the NETCONF implemented via the O1 interface, the SMO functions as a NETCONF client and the O-RU (and/or the Near-RT RIC, the O-CU, the O-DU) functions as a NETCONF server. The SMO etc. as the NETCONF client may generate a list of interfaces supported by each O-RU as the NETCONF server through the RPC (Remote Procedure Call) constituting the NETCONF, and may estimate that, from the fact that an IPV4 container and/or an IPV6 container is present in the O-RAN interface module.

In the conventional O-RAN, all O-RUs have been required to support the IPv4 of the Internet Protocol version. However, some telecommunication carriers that operate O-RANS may not use IPv4, resulting in the IPV4 functionality implemented in O-RUs in vain. According to the present embodiment, the Internet Protocol version of the O-RU can be set to IPv6, thereby alleviating the conventional restrictions about the Internet Protocol version of the O-RU. In addition, according to the present embodiment, it is possible to detect that IPV6 is included in the Internet Protocol version supported by the O-RU, thereby alleviating the conventional restrictions about the Internet Protocol version of the O-RU.

The test profile management unit 13 manages a test profile e.g. of interoperability test (IOT) concerning the interoperability of M-Plane in O-RAN complaint devices that can support IPV6 and/or TLS. As schematically shown in FIG. 3, IoT devices are communication devices (UEs) that are connected to the radio units O-RUs and can communicate with the O-RAN and/or the core network (not shown). In FIG. 3, IoT devices are distinguished from mobile devices such as smartphones and/or cell phones for convenience, but some or all mobile devices can be treated as communication devices (UEs) similar to IoT devices for the IOT in the O-RAN. The test profile management unit 13 is connected to each O-RU via the Open Fronthaul M-Plane and administers the interoperability test profiles for communication devices (UEs) connected to each of such O-RUs. It should be noted that the terms such as "management", "administration", "operation" of the interoperability test profile that the test profile management unit 13 is responsible for should be broadly interpreted.

For example, the test profile management unit 13 applying the test profile of the interoperability test to each O-RU and/or each communication device (UE), the test profile management unit 13 having each O-RU and/or each communication device (UE) conform to the test profile of the interoperability test, the test profile management unit 13 having each O-RU and/or each communication device (UE) follow the test profile of the interoperability test, and the test profile management unit 13 imposing a restriction and/or a rule to each O-RU and/or each communication device (UE) based on the test profile of the interoperability test etc. should be interpreted as "management", "administration" and/or "operation" of the interoperability test profile that the test profile management unit 13 is responsible for. In addition, the test profile management unit 13 applying the test profile of the interoperability test to itself and/or the radio access network control apparatus 1, the test profile management unit 13 having itself and/or the radio access network control apparatus 1 conform to the test profile of the interoperability test, the test profile management unit 13 having itself and/or the radio access network control apparatus 1 follow the test profile of the interoperability test, the test profile management unit 13 imposing a restriction and/or a rule to itself and/or the radio access network control apparatus 1 based on the test profile of the interoperabilty test, and the test profile management unit 13 having itself and/or the radio access network control apparatus 1 allow connection and/or communication of only O-RUs and/or only communication devices (UEs) that conform to the test profile of the interoperability test etc. should be interpreted as "management", "administration" and/or "operation" of the interoperability test profile that the test profile management unit 13 is responsible for.

FIGS. 4 to 7 show a concrete example of the interoperability test profile in the M-Plane of the O-RAN that can support IPv6 and TLS, which is managed, administered and/or operated by the test profile management unit 13.

FIG. 4 shows a concrete example of the interoperability test profile for the "High Level Description" category. The item "Architectural models" is related to the section "2.1.2 M-Plane architecture model" in the O-RAN M-Plane specification, and includes a description "Hierarchical model". The item "IP version" is related to the section "2.1.3 Transport Network" in the O-RAN M-Plane specification, and includes a description "IPV6". The item "Hash algorithm for data integrity" is related to the section "2.4 Security" in the O-RAN M-Plane specification, and includes descriptions "Entry 1) SSHv2-HMAC-SHA2-256" and "Entry 2) TLS1.2-SHA256". The item "Cyphering algorithm" is related to the section "2.4 Security" in the O-RAN M-Plane specification, and includes descriptions "Entry 1) SSHv2-AES128-CTR" and "Entry 2) TLS1.2-AES128-GCM".

In the above, the description "IPV6" in the item "IP Version" enables the interoperability test profile to support IPV6. Besides, the description "Entry 2) TLS1.2-SHA256" in the item "Hash algorithm for data integrity" and the description "Entry 2) TLS1.2-AES128-GCM" in the item "Cyphering algorithm" enable the interoperability test profile to support TLS. These items "Hash algorithm for data integrity" and "Cyphering algorithm" respectively include the descriptions on SSH "Entry 1) SSHv2-HMAC-SHA2-256" and "Entry 1) SSHv2-AES128-CTR", in addition to the descriptions on TLS "Entry 2) TLS1.2-SHA256" and "Entry 2) TLS1.2-AES128-GCM". "Entry 1" and "Entry 2" in these items may be appropriately selectable.

FIG. 5 shows a concrete example of the interoperability test profile for the ""Start up" installation" category. The item "O-RU identification by DHCP option" is related to the section "3.1.1 O-RU identification in DHCP" in the O-RAN M-Plane specification, and includes a description "DHCPv6 (Option: 16)". The item "VLAN Discovery" is related to the section "3.1.2 Management Plane VLAN Discovery Aspects" in the O-RAN M-Plane specification, and includes a description "support VLAN SCAN". The item "IP address assignment" is related to the section "3.1.3 O-RU Management Plane IP Address Assignment" in the O-RAN M-Plane specification, and includes descriptions "Entry 1) IPv6 State-full address configuration" and "Entry 2) Stateless Address Auto-Configuration (SLAAC)". The item "O-RU controller discovery" is related to the section "3.1.4 O-RU Controller Discovery" in the O-RAN M-Plane specification, and includes a description "DHCPv6 (Option: 17)". The item "DHCP format of O-RU controller discovery" is related to the section "3.1.4 O-RU Controller Discovery" in the O-RAN M-Plane specification, and includes a description "O-RU Controller IP Address". The item "NETCONF Call Home" is related to the section "3.2 NETCONF Call Home to O-RU Controller (s)" in the O-RAN M-Plane specification, and includes descriptions "Entry 1) SSH—call home port: 4334" and "Entry 2) TLS—call home port 4335". The item "SSH Connection Establishment" is related to the section "3.3 SSH Connection Establishment" in the O-RAN M-Plane specification, and includes a description "password-based authentication". The item "TCP port for SSH establishment (for test purpose)" is related to the section "3.3.1 NETCONF Security" in the O-RAN M-Plane specification, and includes a description "Default (port 830)". The item "NETCONF Authentication" is related to the section "3.3.2 NETCONF Authentication" in the O-RAN M-Plane specification, and includes descriptions "Entry 1) SSH password-based authentication" and "Entry 2) TLS—X. 509 Certificate". The item "User Account Provisioning" is related to the section "3.3.3 User Account Provisioning" in the O-RAN M-Plane specification, and includes a description "default sudo".

In the above, the description "DHCPv6 (Option: 16)" in the item "O-RU identification by DHCP option", the description "Entry 1) IPv6 State-full address configuration" in the item "IP address assignment", the description "Entry 2) Stateless Address Auto-Configuration (SLAAC)" in the item "IP address assignment", and the description "DHCPv6 (Option: 17)" in the item "O-RU controller discovery" enable the interoperability test profile to support IPV6. "Entry 1" and "Entry 2" in the item "IP address assignment" may be appropriately selectable. Besides, the description "Entry 2) TLS—call home port 4335" in the item "NETCONF Call Home" and the description "Entry 2) TLS—X.509 Certificate" in the item "NETCONF Authentication" enable the interoperability test profile to support TLS. These items "NETCONF Call Home" and "NETCONF Authentication" respectively include the descriptions on SSH "Entry 1) SSH—call home port: 4334" and "Entry 1) SSH password-based authentication", in addition to the descriptions on TLS "Entry 2) TLS—call home port 4335" and "Entry 2) TLS—X. 509 Certificate". "Entry 1" and "Entry 2" in these items may be appropriately selectable.

FIG. 6 shows a concrete example of the interoperability test profile for the ""Start up" installation" category continuing from FIG. 5. The item "sudo" is related to the section "3.4 NETCONF Access Control" in the O-RAN M-Plane specification, and includes a description "used". The item "nms" is related to the section "3.4 NETCONF Access Control" in the O-RAN M-Plane specification, and includes a description "not used". The item "fm-pm" is related to the section "3.4 NETCONF Access Control" in the O-RAN M-Plane specification, and includes a description "not used". The item "swm" is related to the section "3.4 NETCONF Access Control" in the O-RAN M-Plane specification, and includes a description "not used". The item "NETCONF capability" is related to the section "3.5 NETCONF capability discovery" in the O-RAN M-Plane specification, and includes a description "yang-library, Writable-running Capability, rollback on error, XPATH capability, Notifications, Interleave capability". The item "Watchdog timer" is related to the section "3.6 Monitoring NETCONF connectivity" in the O-RAN M-Plane specification, and includes a description "used".

FIG. 7 shows a concrete example of the interoperability test profile for other categories. The category "O-RU to O-DU Interface Management" includes the items "VLAN tagging for C/U/M-Plane", "C/U Plane IP Address Assignment", "Definition of processing elements", "C/U Plane Transport Connectivity", and "O-RU Monitoring of C/U Plane Connectivity". The item "VLAN tagging for C/U/M-Plane" is related to the sections "3.1.2 Management Plane VLAN Discovery Aspects" and "4.3 C/U Plane VLAN Configuration" in the O-RAN M-Plane specification, and includes a description "used for C/U/M-Plane". The item "C/U Plane IP Address Assignment" is related to the section "4.4 O-RU C/U Plane IP Address Assignment" in the O-RAN M-Plane specification, and includes a description "not used". The item "Definition of processing elements" is related to the section "4.5 Definition of processing elements" in the O-RAN M-Plane specification, and includes a description "a combination of VLAN identity and MAC address". The item "C/U Plane Transport Connectivity" is related to the section "4.6 Verifying C/U Plane Transport Connectivity" in the O-RAN M-Plane specification, and includes a description "Loop-back Protocol (LB/LBM) ". The item "O-RU Monitoring of C/U Plane Connectivity" is related to the section "4.10 O-RU Monitoring of C/U Plane Connectivity" in the O-RAN M-Plane specification, and includes a description "not used".

The item "Baseline configuration" in the category "Configuration Management" is related to the section "6.1 Baseline configuration" in the O-RAN M-Plane specification, and includes a description "2 phases". The item "subscribe notification" in the category "Fault Management" is related to the section "8.2 Manage Alarms Request" in the O-RAN M-Plane specification, and includes a description "default stream". The item "Sync Capability Object" in the category "Synchronization Aspects" is related to the section "10.2 Sync Capability Object" in the O-RAN M-Plane specification, and includes descriptions "Entry 1: CLASS_B" and "Entry 2: ENHANCED". These "Entry 1" and "Entry 2" may be appropriately selectable. The item "Activation, deactivation and sleep" in the category "Details of O-RU Operations" is related to the section "12.3.2 Activation, deactivation and sleep" in the O-RAN M-Plane specification, and includes a description "used".

The conventional interoperability test profiles in the M-Plane of the O-RAN support only IPv4 and do not support IPv6 and TLS. According to the present embodiment, the interoperability test profile in the M-Plane of the O-RAN is capable of supporting IPV6 and TLS, thereby alleviating the conventional restrictions about such interoperability test profile.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMS and various integrated circuits can be used. As software resources, for example, programs such as operating systems and applications can be used.

The present disclosure may be expressed as the following items.

1. A radio access network control apparatus comprising at least one processor that performs: by a test profile management unit, managing a test profile of interoperability test of M-Plane in O-RAN compliant device capable of supporting IPV6.

2. The radio access network control apparatus according to item 1, wherein the test profile includes a description on IPv6 in the "IP Version" item.

3. The radio access network control apparatus according to item 1 or 2, wherein the test profile includes a description on DHCPv6 in the "O-RU identification by DHCP option" item.

4. The radio access network control apparatus according to any of items 1 to 3, wherein the test profile includes a description on state-full address configuration in the "IP address assignment" item.

5. The radio access network control apparatus according to any of items 1 to 4, wherein the test profile includes a description on stateless address auto-configuration in the "IP address assignment" item.

6. The radio access network control apparatus according to any of items 1 to 5, wherein the test profile includes a description on DHCPv6 in the "O-RU controller discovery" item.

7. A radio access network control apparatus comprising at least one processor that performs: by a test profile management unit, managing a test profile of interoperability test of M-Plane in O-RAN compliant device capable of supporting TLS.

8. The radio access network control apparatus according to item 7, wherein the test profile includes a description on TLS in the "Hash algorithm for data integrity" item.

9. The radio access network control apparatus according to item 7 or 8, wherein the test profile includes a description on TLS in the "Cyphering algorithm" item.

10. The radio access network control apparatus according to any of items 7 to 9, wherein the test profile includes a description on TLS in the "NETCONF Call Home" item.

11. The radio access network control apparatus according to any of items 7 to 10, wherein the test profile includes a description on TLS in the "NETCONF Authentication" item.

12. The radio access network control apparatus according to any of items 8 to 11, wherein the test profile includes a description on SSH in addition to the description on TLS in each of the above items.

13. A radio access network control method comprising: managing a test profile of interoperability test of M-Plane in O-RAN compliant device capable of supporting IPv6.

14. A radio access network control method comprising: managing a test profile of interoperability test of M-Plane in O-RAN compliant device capable of supporting TLS.

15. A computer-readable medium storing a radio access network control program causing a computer to perform: managing a test profile of interoperability test of M-Plane in O-RAN compliant device capable of supporting IPv6.

16. A computer-readable medium storing a radio access network control program causing a computer to perform: managing a test profile of interoperability test of M-Plane in O-RAN compliant device capable of supporting TLS.

INDUSTRIAL APPLICABILITY

The present disclosure relates to management of an interoperability test profile in an M-Plane of an O-RAN.

REFERENCE SIGNS LIST

1 radio access network control apparatus, 11 IP version setting unit, 12 IP version detecting unit, 13 test profile management unit.

What is claimed is:

1. A radio access network control apparatus configured to perform:

by a test profile management unit, managing a test profile of interoperability test of M-Plane in open radio access network (O-RAN) compliant device capable of supporting IPv6, wherein the managing comprises administering, by the test profile management unit, the test profile to test interoperability of a communication device connected to an O-RAN radio unit (O-RU), the O-RU being communicatively between the test profile management unit and the communication device and being connected to the test profile management unit via the M-Plane, wherein the test profile is for a hierarchical architectural model, and wherein the test profile includes a description on IPv6 in an 'IP Version' item and a description on DHCPv6 in an 'O-RU identification by DHCP option' item for testing interoperability.

2. The radio access network control apparatus according to claim 1, wherein the test profile includes a description on IPv6 in the "IP Version" item.

3. The radio access network control apparatus according to claim 1, wherein the test profile includes a description on DHCPv6 in the "O-RU identification by DHCP option" item.

4. The radio access network control apparatus according to claim 1, wherein the test profile includes a description on state-full address configuration in the "IP address assignment" item.

5. The radio access network control apparatus according to claim 1, wherein the test profile includes a description on stateless address auto-configuration in the "IP address assignment" item.

6. The radio access network control apparatus according to claim 1, wherein the test profile includes a description on DHCPv6 in the "O-RU controller discovery" item.

7. A radio access network control apparatus configured to perform:

by a test profile management unit, managing a test profile of interoperability test of M-Plane in O-RAN compliant device capable of supporting TLS, wherein the managing comprises administering, by the test profile management unit, the test profile to test interoperability of a communication device connected to an O-RAN radio unit (O-RU), the O-RU being communicatively between the test profile management unit and the communication device and being connected to the test profile management unit via the M-Plane, wherein the test profile is for a hierarchical architectural model, and wherein the test profile includes a description on IPV6 in an 'IP Version' item and a description on DHCPv6 in an 'O-RU identification by DHCP option' item for testing interoperability.

8. The radio access network control apparatus according to claim 7, wherein the test profile includes a description on TLS in the "Hash algorithm for data integrity" item.

9. The radio access network control apparatus according to claim 7, wherein the test profile includes a description on TLS in the "Cyphering algorithm" item.

10. The radio access network control apparatus according to claim 7, wherein the test profile includes a description on TLS in the "NETCONF Call Home" item.

11. The radio access network control apparatus according to claim 7, wherein the test profile includes a description on TLS in the "NETCONF Authentication" item.

12. The radio access network control apparatus according to claim 7, wherein the test profile includes descriptions on both TLS and SSH in at least one item.

13. A radio access network control method comprising:

managing a test profile of interoperability test of M-Plane in O-RAN compliant device capable of supporting IPv6, wherein the managing comprises administering, by a test profile management unit, the test profile to test interoperability of a communication device connected to an O-RAN radio unit (O-RU), the O-RU being communicatively between the test profile management unit and the communication device and being connected to the test profile management unit via the M-Plane, wherein the test profile is for a hierarchical architectural model, and wherein the test profile includes a description on IPV6 in an 'IP Version' item and a description on DHCPv6 in an 'O-RU identification by DHCP option' item for testing interoperability.

14. A radio access network control method comprising:

managing a test profile of interoperability test of M-Plane in O-RAN compliant device capable of supporting TLS, wherein the managing comprises administering, by the test profile management unit, the test profile to test interoperability of a communication device connected to an O-RAN radio unit (O-RU), the O-RU being communicatively between the test profile management unit and the communication device and being connected to the test profile management unit via the M-Plane, and wherein the test profile is for a hierarchical architectural model, and wherein the test profile includes a description on IPv6 in an 'IP Version' item and a description on DHCPv6 in an 'O-RU identification by DHCP option' item for testing interoperability.

15. A computer-readable medium storing a radio access network control program causing a computer to perform:

managing a test profile of interoperability test of M-Plane in O-RAN compliant device capable of supporting IPv6, wherein the managing comprises administering, by the test profile management unit, the test profile to test interoperability of a communication device connected to an O-RAN radio unit (O-RU), the O-RU being communicatively between the test profile management unit and the communication device and being connected to the test profile management unit via the M-Plane, wherein the test profile is for a hierarchical architectural model, and wherein the test profile includes a description on IPv6 in an 'IP Version' item and a description on DHCPv6 in an 'O-RU identification by DHCP option' item for testing interoperability.

16. A computer-readable medium storing a radio access network control program causing a computer to perform:

managing a test profile of interoperability test of M-Plane in O-RAN compliant device capable of supporting TLS, wherein the managing comprises administering, by the test profile management unit, the test profile to test interoperability of a communication device connected to an O-RAN radio unit (O-RU), the O-RU being communicatively between the test profile management unit and the communication device and being connected to the test profile management unit via the M-Plane, wherein the test profile is for a hierarchical architectural model, and wherein the test profile includes a description on IPv6 in an 'IP Version' item and a description on DHCPv6 in an 'O-RU identification by DHCP option' item for testing interoperability.

17. The radio access network control method according to claim 13, further comprising setting an Internet Protocol (IP) version of the O-RU to one of a plurality of selectable, predetermined IP version settings which comprise (a) IPv4, (b) IPv6, or (c) both IPv4 and IPv6.

18. The radio access network control method according to claim 13, further comprising detecting an Internet Protocol (IP) version supported by the O-RU as one of a plurality of detectable, predetermined IP version information which comprise (a) IPv4, (b) IPv6, or (c) both IPv4 and IPv6.

* * * * *